United States Patent [19]
Conroy, Sr.

[11] Patent Number: 6,161,565
[45] Date of Patent: Dec. 19, 2000

[54] PNEUMATIC CONTROL

[76] Inventor: Joseph P. Conroy, Sr., 4375 Hickory Ridge, Brunswick, Ohio 44212

[21] Appl. No.: 09/337,980

[22] Filed: Jun. 22, 1999

Related U.S. Application Data

[63] Continuation-in-part of application No. 08/630,005, Apr. 8, 1996, Pat. No. 5,832,951, and a continuation-in-part of application No. 09/054,744, Apr. 3, 1998, Pat. No. 5,954,084.

[51] Int. Cl.[7] .................................................. B60C 23/00
[52] U.S. Cl. .......................................... 137/230; 137/224
[58] Field of Search .................................. 137/224, 230, 137/223; 152/415, 427

[56] References Cited

U.S. PATENT DOCUMENTS

| | | | |
|---|---|---|---|
| 2,900,007 | 8/1959 | Hoogendoorn | 152/415 |
| 4,660,590 | 4/1987 | Sanchez | 137/230 X |
| 4,700,763 | 10/1987 | Williams | 152/427 X |
| 4,730,656 | 3/1988 | Goodell et al. | 137/224 X |
| 5,181,977 | 1/1993 | Gneiding et al. | 152/427 X |
| 5,295,504 | 3/1994 | Riquier et al. | 137/233 |
| 5,398,744 | 3/1995 | Street et al. | 152/427 X |
| 5,538,062 | 7/1996 | Stech | 152/415 X |
| 5,832,951 | 11/1998 | Conroy, Sr. | 137/230 |
| 5,954,084 | 9/1999 | Conroy, Sr. | 137/230 |

*Primary Examiner*—John Rivell
*Assistant Examiner*—Meredith H. Schoenfeld
*Attorney, Agent, or Firm*—David D. Wasil; David R. Percio; Walker & Jocke

[57] ABSTRACT

A pneumatic control apparatus and method controls gas pressure inside a tire (40) mounted on a wheel (32) which rotates about the centerline of an axle (30). A bleeder valve (28) is mounted on a body coaxially aligned with the axle centerline and is in fluid connection through passages (14, 18) in the billet and tubing (24) with a pneumatic fitting (23) on the tire. The bleeder valve allows gas inside the tire to be relieved to the atmosphere when the gas is above a set pressure. The coaxial alignment of the bleeder valve with the axle centerline permits the bleeder valve to relieve gas pressure unaffected by centrifugal forces.

20 Claims, 3 Drawing Sheets

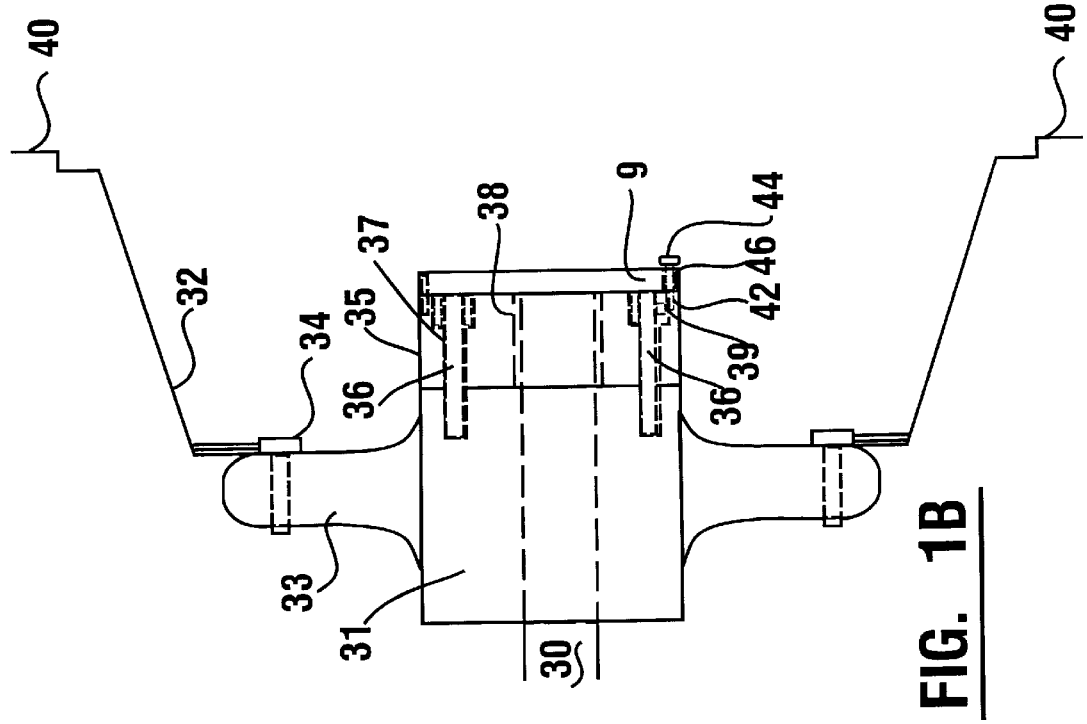
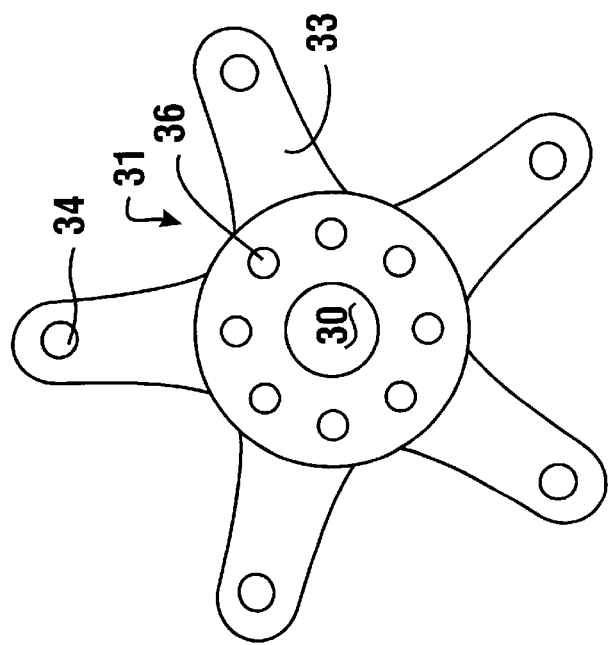
FIG. 1A
FIG. 1B

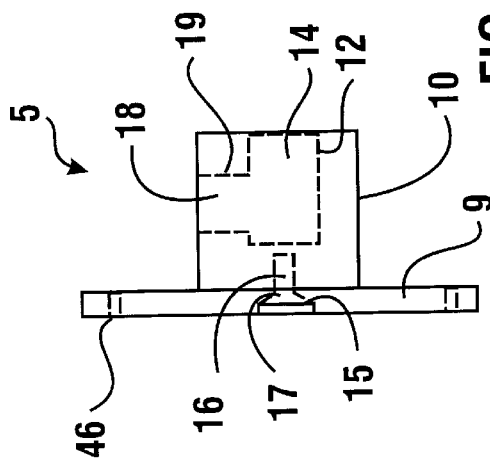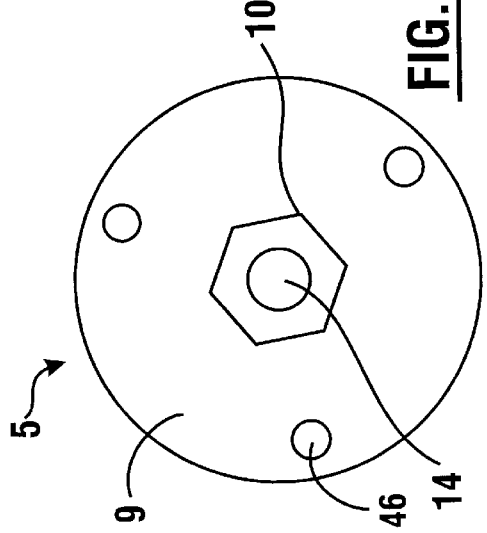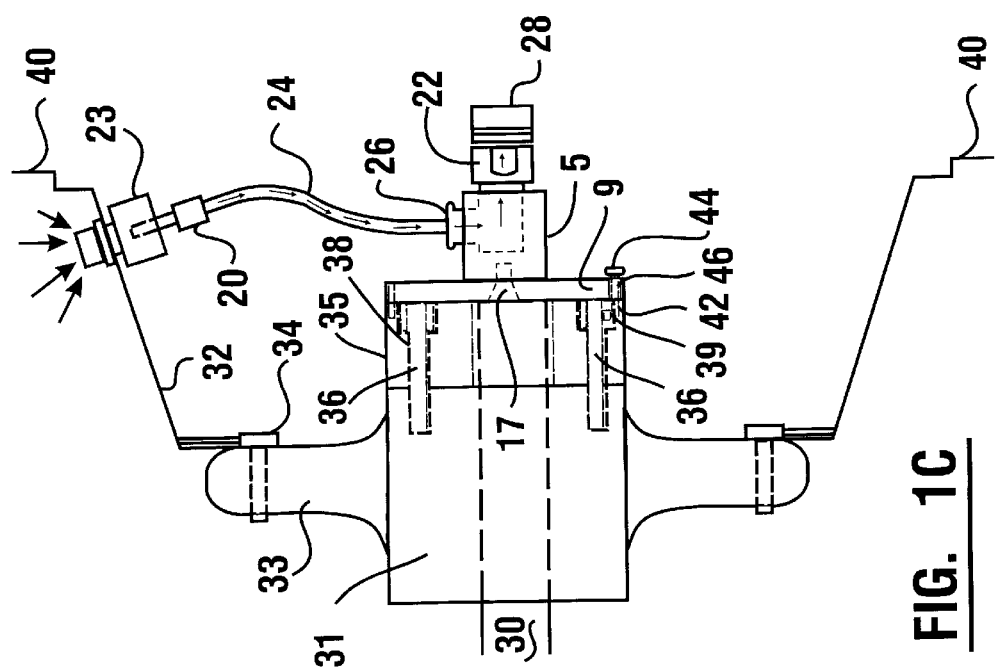

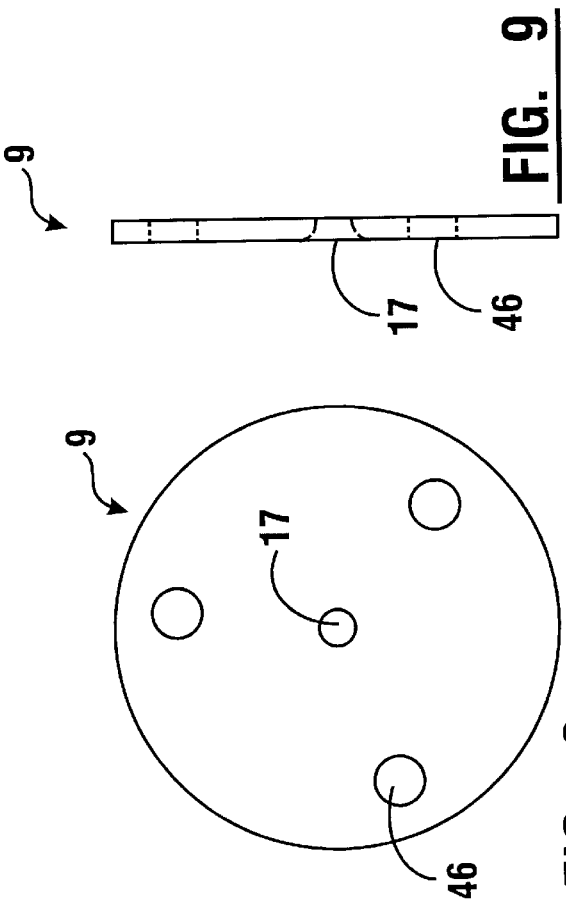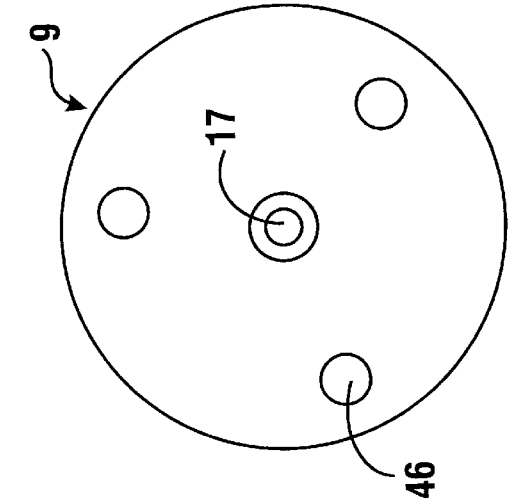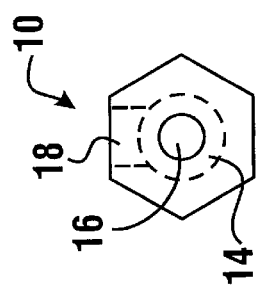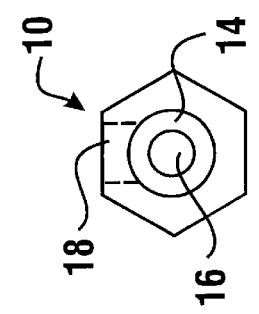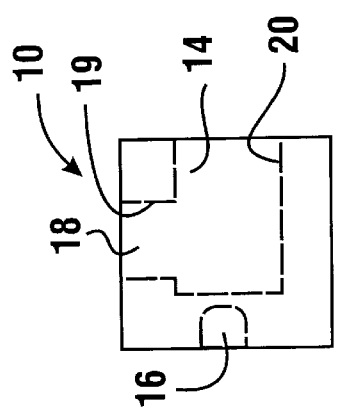

PNEUMATIC CONTROL

CROSS REFERENCE TO RELATED APPLICATIONS

This application is a continuation-in-part application of Ser. No. 08/630,005, filed Apr. 8 1996, now U.S. Pat. No. 5,832,951 issued Nov. 10, 1998 and a continuation-in-part application of Ser. No. 09/054,744, filed Apr. 3, 1998 now U.S. Pat. No. 5,954,084 issued Sep. 21, 1991.

TECHNICAL FIELD

This invention relates to a fluid control method and apparatus. Specifically the invention relates to a pneumatic control method and apparatus to control gas pressure in a tire, and more specifically to a tire rotated at high speed as in a race car.

BACKGROUND ART

During high speed operation of a pneumatic tire, such as on a race car tire mounted on a wheel, tire fill gas (typically air or nitrogen and hereinafter referred to as "air" or "gas") inside the tire expands. Tire pressure may increase to such an extent that operation or safety may be adversely affected. Air bleeders have been used to limit pressure in a tire by allowing air to escape at pressures above a set level. Bleeders are installed in the wheel, either in the valve stem hole or in a hole 180 degrees opposite the valve stem.

The tire bleeder described in U.S. Pat. No. 5,257,642 and U.S. Pat. No. 5,954,084 is one such bleeder manufactured by Aero-Weld. This bleeder is a round machined piece of aluminum approximately 5/8 inches in diameter and 3/4 inches long. It has a tapered seat, a poppet valve that is spring loaded against a knurled end cap. When the pressure inside a tire is high enough to overcome the spring pressure, the poppet valve opens, venting or bleeding air to the atmosphere. When sufficient air has escaped, the spring forces the poppet valve to close. The bleeder may be adjusted to a desired pressure by tightening or loosening an end cap. The end cap is locked in position by a lock nut.

A problem arises when the wheel is rotated at high speed. Centrifugal force works in an opposite direction of the bleeder poppet valve. That is, the centrifugal force from tire rotation is added to the spring force, thus requiring a higher tire pressure on the poppet valve before it can open, and not letting it bleed off air as desired at the set pressure. This increased pressure above the set pressure causes the tire to grow in size upsetting the balance of the race car.

Thus there exists the need for a method of regulating tire air pressure with a bleeder valve that is not affected by centrifugal force occurring when a tire is rotated at high speed.

DISCLOSURE OF INVENTION

It is an object of the present invention to provide a pneumatic control apparatus and method.

It is a further object of the present invention to provide a pneumatic control apparatus and method that releases air from a tire.

It is a further object of the present invention to provide a pneumatic control apparatus and method that releases air from a tire that will work with no other forces that will impair its working characteristics.

It is a further object of the present invention to provide a pneumatic control apparatus and method that releases air from a tire without being affected by forces due to tire rotation.

It is a further object of the present invention to provide a pneumatic control apparatus and method that is quickly, efficiently and conveniently installed on an axle.

It is a further object of the present invention to provide a pneumatic control apparatus and method that can be economically installed on an axle.

The foregoing objects are accomplished in a preferred form of the pneumatic control apparatus and method of the present invention by a body mountable on a drive flange on a live hub of a race car axle. The foregoing objects are accomplished for an axle and a live hub having a drive flange sealed with a removable cover by using a body having a perimeter corresponding to the removable cover. The body has a center passage coaxially aligned with the axle centerline and pneumatically connected with a bleeder valve coaxially aligned with the center passage and the axle centerline.

Tubing pneumatically connected to the tire is routed from the tire to a passage in the body extending outwardly from the axle centerline. Air from the tire pressurizes the tubing, body and bleeder which are pneumatically connected with the tire. Pressure above the set pressure of the bleeder opens the bleeder thereby reducing tire pressure until the set pressure is reached and the bleeder closes. The coaxial location of the bleeder allows operation without being subjected to centrifugal forces as the wheel rotates.

BRIEF DESCRIPTION OF THE DRAWINGS

FIG. 1A is an end view of a wide five live hub held in place on an axle by a drive flange.

FIG. 1B is a side view of a wide five live hub held in place on an axle, shown in phantom, by a drive flange and a wheel mounted to the spokes of the live hub.

FIG. 1C is a side view of a preferred embodiment of the pneumatic control of the present invention with a billet assembly in place on a cutaway of a live hub flange axle and a wheel, and further showing in phantom a coaxially aligned center passage and a radial passage through the billet, a connection of tubing to a coupling, and the direction of air flow from inside the tire through the tubing and the passage through the billet and out to atmosphere through a bleeder.

FIG. 2 is a side view of the preferred embodiment the billet assembly of the pneumatic control of the present invention shown in FIG. 1 in attached relation with a circular cover by a billet screw, and further showing in phantom a coaxially aligned center passage and a radial passage.

FIG. 3 is a plan view of the outboard end of the body shown in FIG. 2.

FIG. 4 is a side view of the cylindrical billet shown in FIGS. 1–3.

FIG. 5 is a plan view of the outboard end of the billet of FIG. 4, and further showing the radial passage in phantom.

FIG. 6 is a plan view of the inboard end of the billet, and further showing the center passage, the radial passage and the billet screw tap in phantom.

FIG. 7 is a plan view of the inboard side of the cover showing a countersunk billet screw hole.

FIG. 8 is a plan view of the outboard side of the cover.

FIG. 9 is a side view of the cover showing the billet screw hole and axle screw holes in phantom.

BEST MODE FOR CARRYING OUT INVENTION

Referring now to the drawings and particularly to FIGS. 1A and 1B, there is shown in FIG. 1A an end view of a wide five hub 31 in place on an axle 30. Hub 31 has one or more tapered bearing races (not shown) which permit hub 31 to rotate freely on axle 30. The tapered bearing races cooperate with a lock nut (not shown) to hold hub 31 on axle 30. Hub 31 has a plurality of spokes 33 each of which has a wheel stud 34 for mounting a wheel 32. A wide five hub has five such spokes.

Hub 31 further has a plurality of hub stubs 36 for mounting a drive flange 35 as shown in FIG. 1B. Drive flange 35 has a plurality of hub stud passages 37. Hub studs 36 pass through hub stud passages 37 and hub 31 is held in place by hub nuts 39. Hub stud passages 37 are typically countersunk to permit hub nuts 39 to be held inboard of the outboard end of drive flange 35.

Drive flange 35 typically has a splined interior surface 38 to mate with a splined exterior surface of an outboard end of axle 30 to allow operative connection between axle 30 and drive flange 35. As axle 30 rotates the splined connection with drive flange 35 causes drive flange 35 to rotate and to cause hub 31 to rotate freely on the bearing races riding on axle 30.

Referring to FIG. 1C, there is shown therein a side view of a preferred embodiment of the pneumatic control of the present invention. Drive flange 35 has a plurality of threaded axle cover screw taps 42. It is common for drive flanges to have three threaded screw taps 42 spaced 120° apart around the circumference of the outboard end of the drive flange. Axle cover screw taps 42 permit attachment of a dust cover 9 to prevent entry of dust and other contaminants into the interior of hub 31 through which axle 30 passes. In the preferred embodiment of the invention a pneumatic control body 5 is releasably connected to drive flange 35.

As shown in FIGS. 2 and 3, pneumatic control body 5 comprises a cover 9 and a billet 10. In this embodiment billet 10 is releasably connected to cover 9, but in other embodiments may be permanently connected such as by welding or an adhesive, or may be formed in one piece. As shown in FIGS. 7–9 axle cover 9 has a plurality of screw holes 46, the number and location corresponding to the number of axle cover screw taps 42 in drive flange 35. Axle cover 9 may be made of any metal or plastic compound which can be machined, molded or formed and which can withstand the operating environment of a race car axle. Aluminum is a metal which is known to have these characteristics.

Referring again to FIG. 1C, axle cover screws 44 pass through axle cover screws holes 46 and thread into drive flange screw taps 42 in the conventional manner to hold axle cover 9 in place in releasable connection with drive flange 35. In this embodiment axle cover 9 has a billet screw hole 17 coaxial with the centerline of axle 30 and passing longitudinally through cover 9. Billet screw hole 17 is countersunk from the inboard side of axle cover 9 to permit a billet screw 15 to be flush with the inboard side of axle cover 9. In this embodiment billet screw 15 is a ½ inch 10-32 Allen head screw for holding a billet 10 in releasable connection with axle cover 9 as will be described later. Alternatively a 1 inch 10-24 Allen head screw may be used. In other embodiments billet screw hole 17 may not be countersunk. Additionally, a pneumatic control of the present invention may be retrofit to an axle using the existing axle cover by making a suitable billet screw hole 17 or by otherwise connecting billet 10 to cover 9.

Billet 10 is coaxial with the centerline of axle 30. An air bleeder 28 is releasably connected to billet 10, coaxial with the centerline of axle 30. Bleeder 28 allows air above a selected pressure to pass through it to the atmosphere. A tire 40 mounted on a wheel 32 is filled with air at a gas pressure above atmospheric pressure. Tire 40 is in pneumatic connection through tubing 24 with center passage 14 of billet 10 and bleeder 28. Pressure inside tire 40 exceeding the set value of bleeder 28 operates bleeder 28 to allow air to escape until tire pressure is no longer above the set value. As wheel 32 rotates on axle 30, bleeder 28 rotates coaxially with axle 30 and is not subjected to centrifugal forces due to rotation.

FIGS. 2 and 3 show respectively a side view and an end view of a billet assembly 5 having a billet 10 in attached relation with axle cover 9. In the preferred embodiment billet 10 is hexagonal in cross-section, although cylindrical or other multi-faceted cross-sectional shapes may be used. As shown therein and in FIGS. 4–6, billet 10 has a center passage 14 which begins at an outboard end of billet 10 and which runs coaxially along an axis formed by the points at the center of each cross-section along the longitudinal length of billet 10. Coaxial center passage 14 has a threaded tap 12 at an outboard end. Center passage tap 12 may span the entire length of center passage 14.

Billet 10 has a radial passage 18 extending radially outward from center passage 14 and through an outside longitudinal surface of billet 10. Radial passage 18 has a threaded tap 19. Radial passage tap 19 may span the entire length of radial passage 18. Radial passage 18 is in fluid communication with center passage 14 to form a continuous passage through billet 10.

Billet 10 also has a threaded billet screw tap 16 which begins at an inboard end of billet 10 and which runs coaxially along the axis formed by the points at the center of each cross-section along the longitudinal length of billet 10. Billet screw tap 16 may be any convenient depth to accommodate a billet screw 15 of sufficient length to hold billet 10 in connected relation with axle cover 9. In this embodiment billet screw tap 16 communicates with center passage 14 for ease of fabrication. As described above, in other embodiments billet 10 may be in releasable or permanent connected relation with cover 9.

In the preferred embodiments of the invention billet 10 is approximately 1 inch in length and has an outside perimeter selected to fit conveniently on the outboard side of cover 9 while permitting access to cover screws 44. Billet 10 may be made of any metal or plastic compound which can be machined, molded or formed and which can withstand the operating environment of a race car axle. Aluminum is a metal which is known to have these characteristics.

In the embodiment shown in FIGS. 1–6, center passage 14 is approximately 5/16 inches in diameter and has a 1/8-27 National Pipe Thread (N.P.T.) tap 12 beginning at its the outboard end. Radial passage 18 is also approximately 5/16 inches in diameter with a 1/8-27 National Pipe Thread (N.P.T.) tap 19. The center of radial passage 18 is approximately centered longitudinally on billet 10, although different placement may be used. Radial passage 18 is in fluid communication with center passage 14 to form a continuous passage through billet 10.

In the preferred embodiment cover attachment tap 16 is approximately 3/16 inches in diameter with a 10-32 N.P.T., and has a length to communicate with center passage 14 of billet 10. Alternatively, a 3/16 inch diameter 10-24 N.P.T. tap or other convenient tap size may be used.

Cover screws 44 are threaded through cover screw holes 46 to engage axle screw taps 42 thereby holding pneumatic control body 5 in releasable connection within hub 31.

Referring again to FIG. 1C tubing 24 provides for pneumatic connection between tire 40 and billet 10. Although tubing made of any suitable material may be used, tubing made of natural polyethylene provides sufficient durability and flexibility for use in a race car wheel and axle environment for use as tubing 24. A first end of tubing 24 is inserted into a coupling 20, such as a Delrin Acetal Coupling. A second end of tubing 24 is inserted into a fitting 26, such as a Parker-Hannifin Prestolok fitting. Fitting 26 is threaded into radial passage tap 19 and provides fluid communication with the interior of radial passage 18 and center passage 14.

At the outboard end of billet 10 in this embodiment a bleeder coupling 22, such as a Colder Products Company MCD 10-02 chrome plated brass coupling, allows pneumatic connection to air bleeder 28. Connection of tubing coupler 20 to wheel coupling 23 allows pneumatic connection from tire 40 through tubing 24, billet 10 and bleeder coupling 22 to bleeder 28. Arrows show the direction of air flow from tire 40 through tubing 24 to billet 10 and to atmosphere through bleeder 28.

Thus the new pneumatic control apparatus and method of the present invention achieves the above stated objectives, eliminates difficulties encountered in the use of previous devices, solves problems, and attains the desirable results described herein.

In the foregoing description, certain terms have been used for brevity, clarity and understanding. However, no unnecessary limitations are to be implied therefrom because such items are for descriptive purposes and are intended to be broadly construed. Moreover, the descriptions and illustrations are by way of examples and the invention is not limited to the details shown and described.

Further, in the following claims any feature described as a means for performing a recited function shall be construed as encompassing any means capable of performing the recited function and is not limited to the particular means described herein or mere equivalents.

Having described the features, discoveries and principles of the invention, the manner in which it is constructed and operated and the advantages and useful results attained, the new and useful structures, devices, elements, arrangements, parts, combinations, systems equipment, operations and relationships are set forth in the appended claims.

I claim:

1. A pneumatic control apparatus for controlling gas pressure inside a tire mounted on a wheel, the wheel being rotatable in operative connection with an axle, wherein the axle is rotatable about an axle centerline, and wherein the wheel is in supporting connection with a pneumatic fitting, wherein the pneumatic fitting is in fluid communication with the inside of the tire, the apparatus comprising:

a body, wherein the body is releasably connectable to the axle;

a bleeder valve mounted in supporting connection with the body, wherein the bleeder valve is coaxially aligned with the axle centerline, and wherein the bleeder valve enables gas above a set pressure to pass to atmosphere;

an axle cover, wherein the body is in attached relation with the cover;

a tube, wherein the tube fluidly connects the bleeder valve and the pneumatic fitting, whereby gas above the set pressure is relieved from the tire.

2. The apparatus of claim 1 wherein the body is coaxially aligned with the axle centerline.

3. The apparatus of claim 2 wherein the body is hexagonal.

4. The apparatus of claim 1 wherein the body has a fluid passage terminating at a first opening on an exterior surface of the body and originating at a second opening on an exterior surface of the body, and wherein the bleeder valve is in fluid connection with the first opening and the tube is in fluid connection with the second opening.

5. The apparatus of claim 4 wherein the first opening is in threaded connection with a first threaded pneumatic fitting, and wherein the bleeder valve is in releasable connection with the first threaded pneumatic fitting.

6. The apparatus of claim 4 wherein the second opening is in threaded connection with a second threaded pneumatic fitting, and wherein the tube is in releasable connection with the second threaded pneumatic fitting.

7. The apparatus of claim 4 wherein the first opening is in threaded connection with a first threaded pneumatic fitting and wherein the second opening is in threaded connection with a second threaded pneumatic fitting, and wherein the bleeder valve is in releasable connection with the first threaded pneumatic fitting and the tube is in releasable connection with the second threaded pneumatic fitting.

8. The apparatus of claim 1 wherein the body has a passage terminating at a first opening on an exterior surface of the body and originating at a second opening on an exterior surface of the body, and wherein the bleeder valve is in fluid connection with the tube through the passage.

9. The apparatus of claim 8 wherein a second pneumatic fitting is in releasably attached connection with the passage and wherein the bleeder valve in is releasably attached fluid connection with the second pneumatic fitting.

10. The apparatus of claim 9 wherein the tube is in releasably attached fluid connection with the second pneumatic fitting.

11. The apparatus of claim 2 wherein the cover is in attached relation with the axle.

12. The apparatus of claim 11 wherein the body is in releasably attached relation with the cover.

13. The apparatus of claim 12 wherein the cover is in releasably attached relation with the axle.

14. The apparatus of claim 12 wherein the body is held in releasably attached relation with the cover by a screw.

15. The apparatus of claim 1 wherein the body is integral with the cover.

16. The apparatus of claim 1 wherein the body and cover are formed as one piece.

17. A method for controlling gas pressure inside a tire mounted on a wheel, the wheel being rotatable in operative connection with an axle, wherein a body is releasably connectable to the axle, wherein the axle is rotatable about an axle centerline, wherein the wheel is in supporting connection with a pneumatic fitting, wherein the pneumatic fitting is in fluid communication with the inside of the tire, the method comprising the steps of:

placing a bleeder valve in supported connection with the body;

placing the body is in attached relation with an axle cover, wherein the axle cover is in attached relation with the axle;

rotating the bleeder valve in coaxially aligned relation with the axle centerline, wherein the bleeder valve enables gas above a set pressure to pass to atmosphere; and fluidly connecting the bleeder valve and the pneumatic fitting, wherein gas above the set pressure is relieved from the tire.

18. The method of claim 17 wherein the body includes a passage, wherein the connecting step comprises placing a tube in fluid communication with the body passage and the pneumatic fitting.

19. The method of claim 18 wherein the body is in coaxially aligned relation with the axle centerline and wherein the connecting step comprises placing the bleeder valve in fluid communication with the tube through the body passage.

20. A pneumatic control apparatus for controlling gas pressure inside a tire mounted on a wheel, the wheel being rotatable in operative connection with an axle, wherein the axle is rotatable about an axle centerline, and wherein the wheel is in supporting connection with a pneumatic fitting, wherein the pneumatic fitting is in fluid communication with the inside of the tire, the apparatus comprising:

a body, wherein the body is releasably connectable to the axle at a position outside of the axle, wherein the body is coaxially aligned with the axle centerline;

a bleeder valve mounted in supporting connection with the body, wherein the bleeder valve is coaxially aligned with the axle centerline, and wherein the bleeder valve enables gas above a set pressure to pass to atmosphere;

wherein the body has a passage connecting a first opening on an exterior surface of the body and a second opening on an exterior surface of the body, wherein the bleeder valve is in fluid communication with the first opening, a tube, wherein the tube is in fluid communication with the second opening and the pneumatic fitting, wherein the bleeder valve is in fluid communication with the tube through the passage, wherein the bleeder valve and the pneumatic fitting are in fluid communication, whereby gas above the set pressure is relieved from the tire.

* * * * *